No. 715,030. Patented Dec. 2, 1902.
T. C., T. A. & S. C. DARBY.
IMPLEMENT FOR DIGGING OR CULTIVATING LAND.
(Application filed May 5, 1902.)
(No Model.) 3 Sheets—Sheet 1.
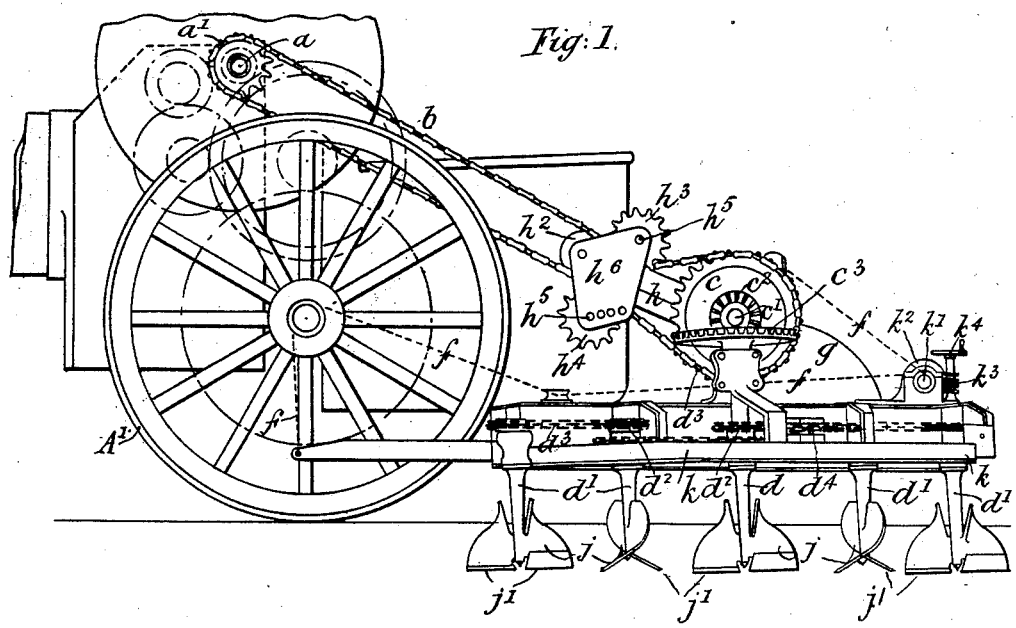
Fig: 1.
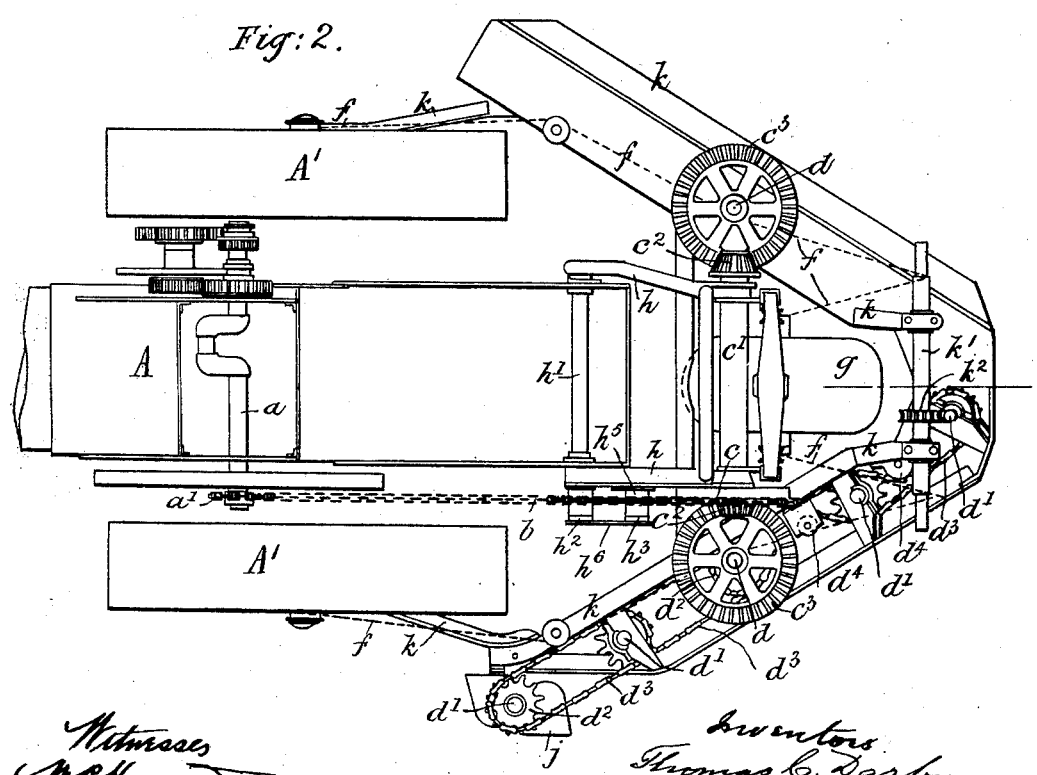
Fig: 2.

No. 715,030. Patented Dec. 2, 1902.
T. C., T. A. & S. C. DARBY.
IMPLEMENT FOR DIGGING OR CULTIVATING LAND.
(Application filed May 5, 1902.)
(No Model.) 3 Sheets—Sheet 2.
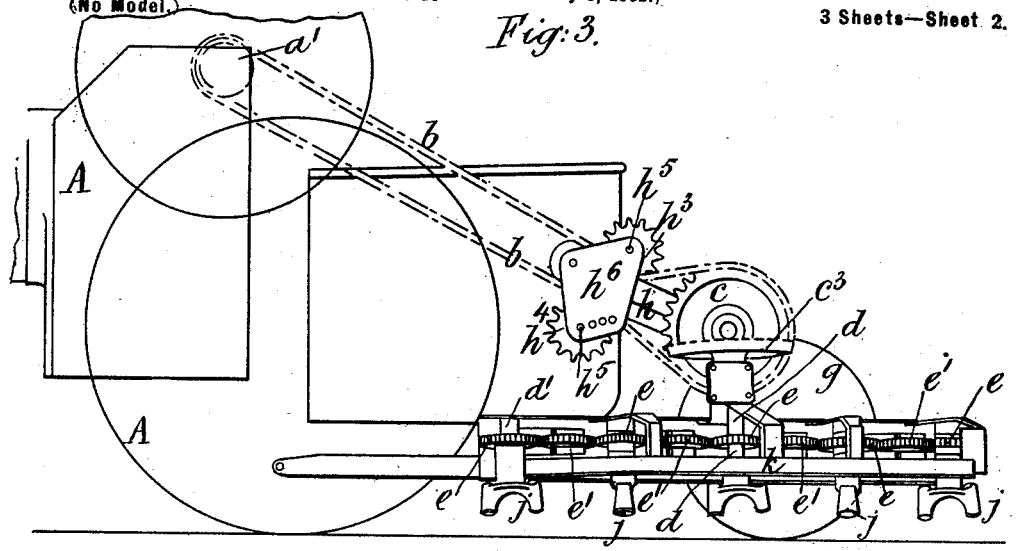
Fig: 3.
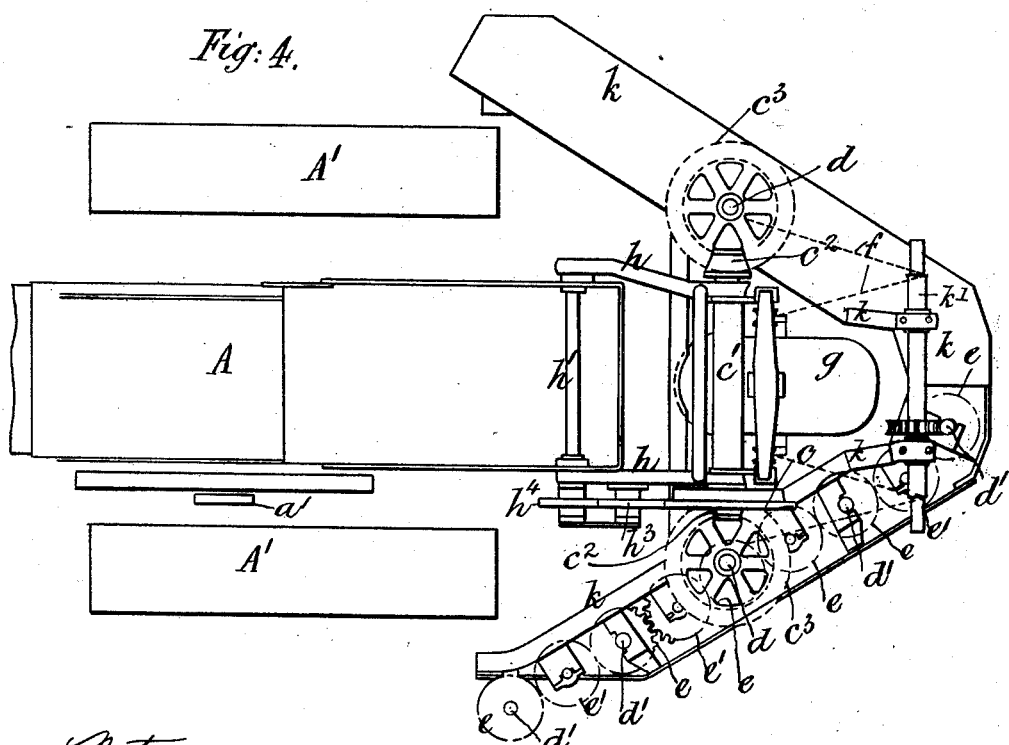
Fig: 4.
Witnesses
Inventors
Thomas C. Darby
Thomas A. Darby
Sidney C. Darby No. 715,030. Patented Dec. 2, 1902.
T. C., T. A. & S. C. DARBY.
IMPLEMENT FOR DIGGING OR CULTIVATING LAND.
(Application filed May 5, 1902.)
(No Model.) 3 Sheets—Sheet 3.

UNITED STATES PATENT OFFICE.

THOMAS C. DARBY, THOMAS A. DARBY, AND SIDNEY C. DARBY, OF WICK-FORD JUNCTION, ENGLAND.

IMPLEMENT FOR DIGGING OR CULTIVATING LAND.

SPECIFICATION forming part of Letters Patent No. 715,030, dated December 2, 1902.

Application filed May 5, 1902. Serial No. 105,994. (No model.)

*To all whom it may concern:*

Be it known that we, THOMAS CHURCHMAN DARBY, THOMAS ALBERT DARBY, and SIDNEY CHARLES DARBY, subjects of the King of Great Britain, residing at Wickford Junction, in the county of Essex, England, have invented certain new and useful Improvements in Implements for Digging or Cultivating Land, of which the following is a full, clear, and exact description, and for which we have made application for patents in Great Britain on the 10th day of October, 1901; in Austria on the 21st day of February, 1902, and in Hungary on the 25th day of February, 1902.

The invention relates to that class of digger shown and described in the specifications of United States Patents No. 605,086, dated June 7, 1898, and No. 661,307, dated November 6, 1900, and has for its object an improved method of driving the implement from the motive power, an improved method of driving the digging-tools, improvements connected with the raising and lowering of the digging-tools, and an improved form of digging-tool.

The invention is illustrated in the accompanying drawings, in which—

Figure 5:
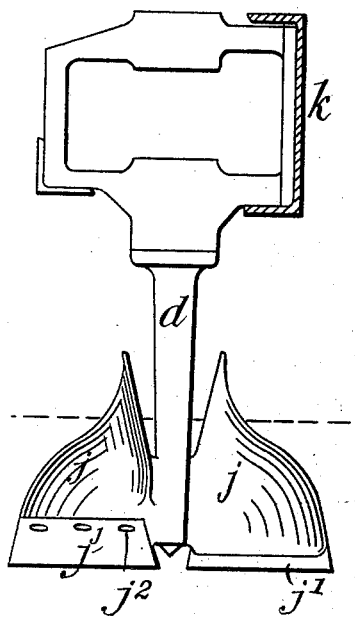
Figure 6:
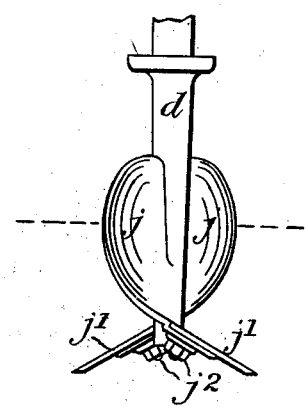
Figure 7:
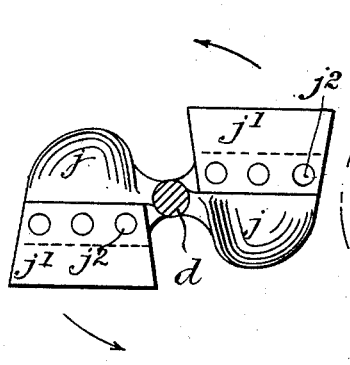
Figure 8:
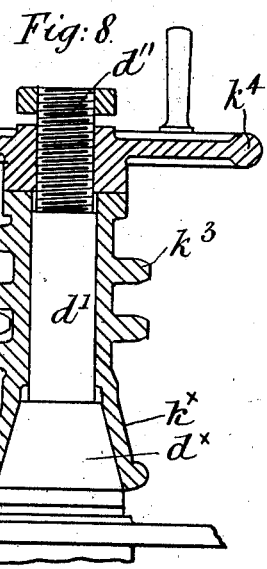

Figure 1 is a side elevation, and Fig. 2 a plan, of one method of carrying the invention into effect. Fig. 3 is a side elevation, and Fig. 4 is a plan, showing a modification in the method of communicating motion from the two driven vertical spindles to the other vertical spindles, upon the lower ends of which the digging-tools are mounted. Figs. 5 and 6 are two elevations at right angles to each other of the digging-tool, and Fig. 7 is a plan of the same. Fig. 8 is a vertical section of a worm-gear and friction-clutch for operating the same, by means of which the digging-tools may be raised and lowered.

A is the traction-engine, having the two road-wheels $A'$, and $a$ is the crank or other rotating shaft driven by the engine. On one end of the shaft $a$ we attach a chain-wheel $a'$, and by means of a chain $b$ we give motion to the chain-wheel $c$ on the main horizontal cross-shaft $c'$ of the digger. This cross-shaft $c'$ is provided at each end with a bevel-pinion $c^2$, which pinions gear with the bevel-wheels $c^3$, fixed on top of the two driven spindles $d$. The vertical spindles $d$ and $d'$ are each provided at their upper ends with one or more chain-wheels $d^2$, and the spindles $d'$ are driven from the spindles $d$ by means of short chains $d^3$.

In Figs. 1 and 2 we have shown two separate short chains $d^3$ giving motion from the spindles $d$ to the two vertical spindles $d'$ to the front thereof and a single chain $d^3$ giving motion to said spindles $d'$ to the rear thereof. In this latter case it is advisable to employ jockey-pulleys $d^4$ to keep the chain $d^3$ in gear with the chain-wheels $d^2$.

In Figs. 3 and 4 in lieu of employing chain-wheels and short chains we have shown toothed wheels $e$ attached to the upper ends of the vertical spindles $d$ and $d'$ and intermediate or carrying pinions $e'$ giving motion from the spindles $d$ to the spindles $d'$.

The digging portion of the implement is carried by means of chains $f$ and an automatically-tilting wheel $g$, as described in the before-mentioned specification, No. 661,307, and is connected to the engine A by means of two links $h$, pivoted to rocking shaft $h'$, on the outer end of which is mounted a pulley $h^2$, over and under which the main chain $b$ runs. Two jockey-pulleys $h^3$ $h^4$, mounted on short shafts $h^5$, carried by the links $h$ and outside plates $h^8$, act to keep the chain $b$ tight.

When it is desired to raise the digging-tools $j$, mounted on the lower ends of the vertical spindles $d$ and $d'$, the frame $k$, and consequently all the digging-tools $j$, is raised by rotating the cross-shaft $k'$, around which the carrying-chains $f$ pass and to which they are attached. This shaft $k'$ has a worm-wheel $k^2$, which receives motion from a worm $k^3$ on the top of one of the vertical spindles $d'$. A suitable clutch (shown in section in Fig. 8) is provided operated by the hand-wheel $k^4$, by means of which the worm $k^3$ may be made fast with its vertical spindle $d$ when it is desired to raise or lower the digging-tools $j$. For this purpose the spindle $d'$ is formed with a cone $d^\times$, fitting within a hollow cone $k^\times$ on the lower end of the hollow shaft, on which the worm $k^3$ is formed. The hand-wheel $k^4$ is threaded to fit a screw-thread $d''$ on the upper end of the spindle $d'$, Fig. 8, so that by turning the hand-wheel $k^4$ to the right the cone $d^\times$ is drawn up into tight frictional contact with the surrounding clutch-sleeve $k^\times$, so that the worm $k^3$ will be driven by the spindle $d'$ and will impart rotation to the worm-gear $k^2$ and windlass-shaft $k'$, thereby winding up the chains $f$ and raising the digging-tools $j$ suspended therefrom.

The digging-tools $j$ are of such a form that they raise the lower soil and bury the top soil. They consist of blades approximately vertical at the upper part, which are twisted and enter the soil at their lower part at an angle. The lower portions of these blades are provided with hard-steel portions $j'$, which are connected to the blades $j$ by bolts $j^2$ and may readily be renewed when necessary. Each spindle $d\ d'$ is provided with one or more of such blades, as shown in the drawings.

What we claim as our invention, and desire to secure by Letters Patent, is—

1. In an implement for digging or cultivating land, the combination of a crank or other shaft on the engine, a chain-wheel fixed on such shaft, a chain-wheel fixed on a cross-shaft carried by the frame of the digging implement, a chain for giving motion from one chain-wheel to the other, and means for communicating motion from said cross-shaft to the vertical spindles carrying the digging-tools, substantially as set forth.

2. In an implement for digging or cultivating land, the combination of a shaft on the engine, a chain-wheel mounted on such shaft, a chain-wheel mounted on a cross-shaft carried by the frame of the digging implement, a chain communicating motion from one chain-wheel to the other, bevel-wheels mounted on the ends of the said cross-shaft, bevel-wheels mounted on the upper ends of two of the vertical spindles, digging-tools mounted upon the lower ends of all the vertical spindles, and means for giving motion from the said two vertical spindles to the other vertical spindles, substantially as set forth.

3. In an implement for digging or cultivating land having a cross-shaft receiving motion from the engine by means of a chain and chain-wheels, the combination of bevel-wheels on each end of said cross-shaft giving motion to two vertical spindles carrying digging-tools, and chains and chain-wheels giving motion to the other vertical spindles carrying digging-tools, each consisting of a twisted blade, the upper part being approximately vertical and the lower part arranged to enter the soil at an angle, substantially as set forth.

4. In an implement for digging or cultivating land receiving motion from the engine by means of a chain and chain-wheels and carried by means of an automatically-tilting wheel and chains attached to and passing around a cross-shaft at the rear of the machine, the combination of a worm-wheel on said cross-shaft, a worm on the top of one of the vertical spindles, and a clutch by means of which the worm may be made fast with the machine when it is desired to raise the digging-tools, substantially as herein set forth.

In testimony whereof we affix our signatures in presence of two witnesses.

T. C. DARBY.
T. A. DARBY.
S. C. DARBY.

Witnesses:
CLAUDE K. MILLS,
WM. GIRLING.